United States Patent [19]

Grendelman

[11] 4,330,016
[45] May 18, 1982

[54] PIPE PART PROVIDED WITH A FLANGE

[75] Inventor: Mannes Grendelman, Hardenberg, Netherlands

[73] Assignee: Wavin B.V., Zwolle, Netherlands

[21] Appl. No.: 88,595

[22] Filed: Oct. 26, 1979

[30] Foreign Application Priority Data

Oct. 31, 1978 [NL] Netherlands ............... 7810838

[51] Int. Cl.³ .................. G01L 11/12; F16L 9/12
[52] U.S. Cl. .................... 138/109; 138/153; 138/174; 138/DIG. 7; 285/405; 285/423
[58] Field of Search ............ 138/109, 126, 127, 138, 138/139, 153, 172, 174, DIG. 7; 285/405, 423

[56] References Cited

U.S. PATENT DOCUMENTS

| | | | |
|---|---|---|---|
| 2,082,611 | 6/1937 | Benge | 138/174 |
| 2,361,933 | 11/1944 | Ferla | |
| 2,879,804 | 3/1959 | Hammond | 138/138 |
| 3,093,160 | 6/1963 | Boggs | |
| 3,460,581 | 8/1969 | Crouch et al. | |
| 3,796,449 | 3/1974 | McLaughlin et al. | 138/174 |
| 3,858,617 | 1/1975 | Takada | |
| 3,899,006 | 8/1975 | Clampleboux et al. | 138/109 |
| 3,920,049 | 11/1975 | Lippert | 138/109 |
| 3,958,531 | 5/1976 | Carter | |
| 4,217,935 | 8/1980 | Grendelman et al. | 138/109 |

FOREIGN PATENT DOCUMENTS

| | | |
|---|---|---|
| 1015607 | 8/1952 | France . |
| 2385967 | 10/1978 | France . |
| 7300572 | 7/1973 | Netherlands . |
| 129645 | 7/1919 | United Kingdom . |

*Primary Examiner*—Steven L. Stephan
*Attorney, Agent, or Firm*—Wigman & Cohen

[57] ABSTRACT

A fiber reinforced plastic pipe is provided with an integral flange, comprising circumferentially extending glass fiber fabrics. As the width of the fabrics exceeds the width of the finished flange, the fabrics are provided with inwardly bent parts at one or both side walls of the flange, or with undulating parts.

9 Claims, 4 Drawing Figures

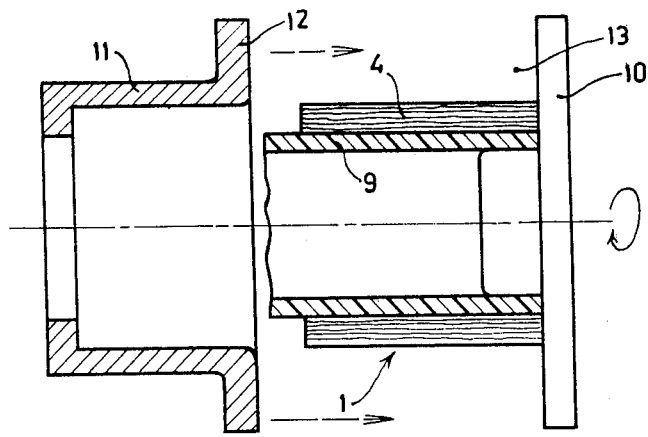
FIG:2.
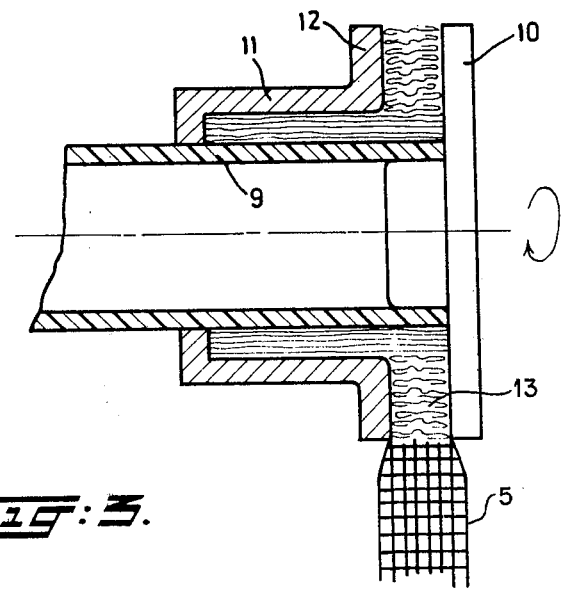
FIG:3.
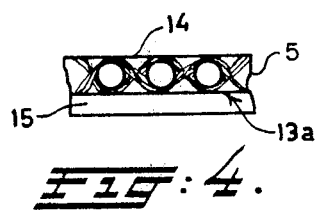
FIG:4.

PIPE PART PROVIDED WITH A FLANGE

BACKGROUND OF THE INVENTION:

1. Field of the Invention

The invention relates to a pipe part provided with an integral flange of fiber reinforced plastic material, more particularly to a wound glass fiber reinforced plastic pipe part provided with a flange.

The invention also relates to a method of manufacturing a pipe part provided with an integral flange of fiber reinforced plastic material by superimposing fiber reinforcing layers and a liquid plastic resin in a flange mould, followed by curing the resin.

2. Brief Description of the Prior Art

A pipe part provided with a flange of fiber reinforced plastic material and a process of manufacturing said pipe, are known per se. In this known process the flange consists of a plurality of superimposed plastic resin-impregnated glass fiber mats and/or glass fabrics.

In order to provide a pipe part with a flange of said type, resin-impregnated (whether or not woven) glass mats have to be deposited into a mould. Said (whether or not woven) glass mats will then on the one hand extend parallel with the flange and on the other hand in a direction parallel with the axis of the pipe part. Said method presents the disadvantage that it is very time-consuming.

Efforts have been made to produce a flange by radially winding smooth or looped rovings, being impregnated in a liquid plastic resin, upon a mandrel. Although a considerable economy of time is obtained with respect to the manual manufacture of flanges by means of resin-impregnated (whether or not woven) glass mats extending on the one hand parallel with the flange surface and on the other hand parallel with the pipe part axis, the strength of the flanges so obtained is absolutely insufficient in an axial direction. As a matter of fact, there are no glass fibers extending axially, while, moreover, the glass fiber layers will easily slide over each other.

The present invention now aims to provide a fiber reinforced plastic pipe part comprising an integral flange and a method for its manufacture, which do not present the aforementioned disadvantages.

SUMMARY OF THE INVENTION

This object is attained in accordance with the invention in that in a plastic fiber reinforced pipe part, provided with an integral flange, said flange comprises a plurality of circumferentially extending fiber reinforcing layers, the distance of at least one fiber reinforcing layer with respect to the axis of the pipe part, varying across the width of the fiber reinforcing layer.

The fiber reinforcing layers preferably consist of radially wound fibers and axially extending fibers, whereas the width of the fiber reinforcing layer in the fiber reinforced fabric, exceeds, in a flat position, that of the finished flange. By using said reinforcing fiber layers in a flange, said reinforcing layers are super-imposed unevenly, thus causing the axial shear forces required for shearing the layers, to be much higher than by applying smooth rovings or exactly concentrically extending fiber reinforcing layers.

In a pipe part, comprising a flange according to the invention, particularly the following advantages are obtained:

(a) the flange in accordance with the invention can be manufactured far more quickly than a manually produced flange, thus causing an economy of time having a factor 5;

(b) the flange has much higher strength properties than the flanges manufactured according to the prior art and;

(c) a flange can now be manufactured in a more reproducible manner.

The fiber reinforcing layer appropriately extends unevenly, one or both sides of said layer being inwardly bent, so that the surfaces of the fiber reinforcing layers do not entirely extend parallel with an adjacent fiber reinforcing layer; this contributes considerably to the high strength of the flange in accordance with the present invention.

At least one fiber reinforcing layer is conveniently inwardly bent at the two sides of the flange so that a very high strength is obtained.

The fiber reinforcing layers appropriately consist of glass filaments.

The invention also provides a process of manufacturing a pipe part provided with a flange of fiber reinforced plastic material, by superimposing fiber reinforcing layers and a liquid plastic resin in a flange mould, followed by curing said resin, wherein a plurality of circumferentially extending reinforcing layers are applied, the distance of at least one fiber reinforcing layer as counted from the axis of the pipe part, being varied across the width of the reinforcing layer.

Very appropriately, a fiber reinforced fabric is used as a fiber reinforcing layer, said fabric consisting of a woven or plaited band or strip of material, the width of the strip, in a flat position, exceeding the width of the flange mould, thus causing said fiber reinforcing layer to be inwardly bent at least at one side and preferably at either side of the finished flange, or to produce axially directed undulations in the fiber reinforcing strip. It goes without saying that both possibilities may occur simultaneously.

On winding a flange in accordance with the invention, inclusion of air is avoided by impregnating only one surface of the fiber reinforcing layer with plastic resin, this being the surface which is brought into contact with a previously deposited non-plastic resin-impregnated surface of a fiber reinforcing layer.

BRIEF DESCRIPTION OF THE DRAWINGS:

FIG. 2 shows a first stage for the formation of a pipe part comprising a flange in accordance with the invention;

FIG. 3 shows a flange in accordance with the invention, with a matching flange mould, and FIG. 4 shows a cross section of a strip of fabric according to the invention.

Figure 1:
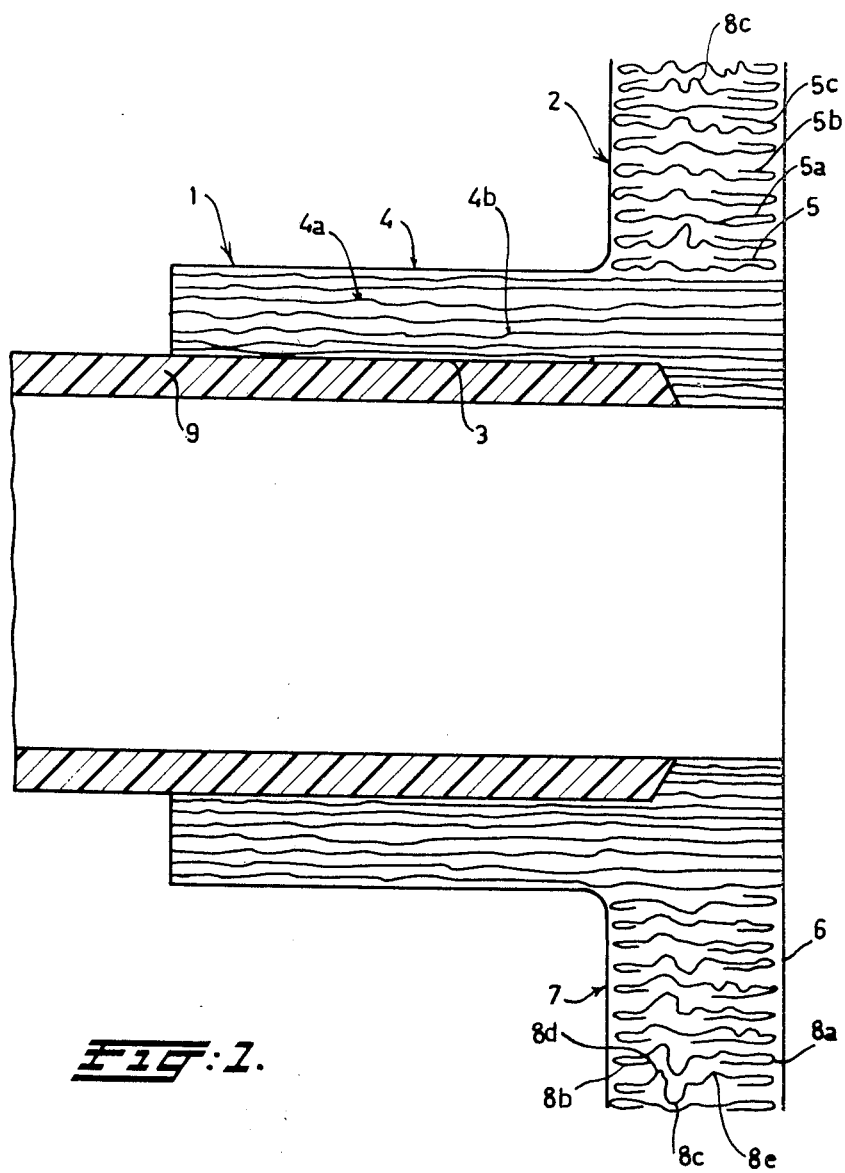
FIG. 1 shows a cross-sectional view of a pipe part comprising a flange, in accordance with the invention, on an enlarged scale.

DESCRIPTION OF A PREFERRED EMBODIMENT:

FIG. 1 shows a pipe part 1 comprising an integral flange 2 of thermosetting resin, e.g., polyester resin. Woven strips of glass filaments 4, 4a, 4b, extend on the inner side 3 of the pipe part with flange 2. Instead of fiber reinforcing strips, said filaments 4, 4a, 4b may also consist of rovings, provided said rovings are wound crosswise and at an angle.

The flange 2 comprises a plurality of superimposed helically wound reinforcing layers, consisting of a woven glass fiber strip. Said layers are referenced 5, 5a, 5b, 5c etc.

As the width of the woven glass fiber strip 5, as used for reinforcing the flange 2, exceeds the width of the flange 2, which is determined by the distance between one flange wall 6 and the other flange wall 7, the edges of the woven or plaited strip 5 will be inwardly bent either near the flange wall 6 and/or near the flange wall 7, thus forming inwardly bent edge parts 8a, 8b. The plaited or woven strip 5 may also be deposited unevenly in between the flange wall 6 and the flange wall 7, thus producing parts 8c located at a distance from the axis of the flange 2 and exceeding that of adjacent parts 8d and 8e of the woven or plaited strip 5 with respect to said flange axis.

The width of the woven glass fiber reinforcing strip 5 may obviously be such that an inwardly bent edge part 8a or 8b is obtained at one edge only. A width and deposit of said woven strip 5 are preferred, however, whereby either inwardly bent edge parts 8a and 8b of the reinforcing strip 5 are obtained at the two walls 6 and 7 of the flange 2, or reinforcing strips 5 are deposited very unevenly at part 8c in between said walls 6 and 7 of the flange 2. As it is obvious that woven glass fiber reinforcing strips 5, as used for obtaining said reinforcements, cannot possibly comprise inwardly bent edges, 8a or 8b exactly corresponding to one another, a very uneven deposit of the woven glass fiber reinforcing strips 5 is obtained. In this respect reference is made to reinforcing layer 5c shown in FIG. 1, which figure clearly shows that the woven strip 5 is also deposited very unevenly in the center part 8c of the flange 2. The inwardly bent edges 8a and 8b and the uneven deposit part 8c of woven glass fiber reinforcing strips 5 result in an optimum strength of the flange 2.

The manufacture of a flange 2 according to the invention proceeds as follows.

Resin- (e.g. polyester) impregnated glass filaments 4 are wound upon a mandrel 9, such that said filaments extend to an end plate 10 shown being connected with said mandrel 9 in FIGS. 2 and 3. The mandrel 9 may consist of metal, but also of a pipe part, for example a glass fiber reinforced pipe part.

After having wound said resin-impregnated glass filaments 4 upon the mandrel 9, a moulding element 11, comprising a flange part 12, is slid over the mandrel 9 and the plastic resin-impregnated woven glass filament reinforcing strips 4 applied thereupon. By applying the moulding element 11, a flange mould 13 is formed between the plate 10 and the flange mould 12 for moulding the plastic flange 2. During the sliding of the moulding element 11, the different filaments 4 will slightly move over each other and thus they will be upset at their ends against plate 10. Dotted lines in FIG. 2 show the direction of movement of the element 11 before the moulding element 11 has been pushed over the mandrel 9.

Subsequently a woven glass filament strip 5 is helically wound in the flange 2 mould 13 until the desired outer diameter of the flange is obtained. As the width of the glass filament strip 5, as used for moulding the flange 2, exceeds the width of the flange mould 13, a very uneven deposit of the woven glass fiber strip 5 takes place, thus providing an optimum strength of the flange 2. Particularly, inwardly bent edge parts 8a and/or 8b of the woven glass filament strip 5 and/or unevenly deposited central parts 8c, are obtained.

As described hereinbefore, the reinforcing layer of strips 5, as used for moulding the flange 2, consists of reinforcing fabric, in particular, a woven or plaited band or strip of glass filaments.

Pipe part 1 can advantageously be connected with a length of pipe in order to provide said length of pipe with a coupling flange 2.

It has been found that a flange 2, obtained in accordance with the present invention, can be manufactured five times as quick as flanges known per se, because of helically winding the reinforcing band or strip 5, while said flange 2 can also be made more reproducible than the known manually produced flange.

By helically winding the woven strip 5 or band of glass filaments, only surface 13a of said strip 5 is coated with a resin coating 15, while upper surface 14 of the woven glass filament strip 5 remains uncoated (see FIG. 4). In this manner a flange 2 is produced wherein no air inclusions will occur.

Obviously, non-woven glass mats may be accomodated in between said woven glass filament strips 5.

The presence of woven strips 5 is, however, essential in order to remove air from the wound material, as air inclusions will give rise to material deficiencies.

The width of the reinforcing layer appropriately exceeds the width of the finished flange by 5 to 80%. The width of the reinforcing layer preferably exceeds the width of the finished flange 2 by 20 to 60% and more preferably by about 40 to 50%.

The foregoing preferred embodiment is considered as illustrative only. Numerous other modifications and changes will readily occur to those skilled in the art of plastic pipe manufacturing and, consequently, the disclosed invention is not limited to the exact construction and operation shown and described hereinabove.

I claim:

1. A pipe part, provided with an integral flange of fiber reinforced plastic material, wherein the integral flange comprises:
   a plurality of helically wound, radially superimposed, continuous, fiber reinforcing layers;
   wherein the width of the fiber reinforcing layers, immediately before entering a mould for the integral flange, exceeds the width of the finished integral flange; and
   wherein the integral flange has, in its final form, one of waves, crinkles, and folds in its helically wound, radially superimposed, continuous, fiber reinforcing layers.

2. The pipe part according to claim 1, wherein the fiber reinforcing layers include axially extending fibers in addition to helically wound fibers.

3. The pipe part according to claim 1, wherein the fiber reinforcing layers include a reinforcing fabric.

4. The pipe part according to claim 1, wherein the fiber reinforcing layers are inwardly bent at at least one side of a wall of the integral flange.

5. The pipe part according to claim 1, wherein at least one of the plurality of fiber reinforcing layers has been deposited extending undulatingly in an axial direction.

6. The pipe part according to claim 5, wherein said at least one of the plurality of fiber reinforcing layers extending undulatingly in the axial direction are deposited in a portion of the pipe part following the integral flange.

7. A method of manufacturing a pipe part, provided with an integral flange of fiber reinforced plastic material, comprising the steps of:
- helically winding at least one continuous fiber reinforcing layer coated with a liquid plastic resin in a flange mould;
- depositing the at least one fiber reinforcing layer in a manner so that the width of the fiber reinforcing layer, immediately before entering the flange mould, exceeds the width of the flange mould; and
- bending the at least one fiber reinforcing layer inwardly at at least one side wall of the flange mould;
- whereby the integral flange has, in its final form, one of waves, crinkles, and folds in the at least one fiber reinforcing layer.

8. The method according to claim 7, further comprising the steps of:
- forming a pipe part by helically winding a plurality of fiber reinforcing layers around a pipe mandrel,
- subsequently axially sliding the plurality of fiber reinforcing layers over each other, and
- forming undulations in the center part of the at least one fiber reinforcing layer.

9. The method according to claim 7, further comprising the steps of:
- impregnating only one surface of another fiber reinforcing layer with liquid plastic resin,
- bringing the one surface of the other fiber reinforcing layer into contact with a non-impregnated surface of the at least one fiber reinforcing layer, and
- avoiding substantially any inclusions of air in the integral flange of the pipe part.

* * * * *